United States Patent
Brandt et al.

(10) Patent No.: US 6,379,761 B1
(45) Date of Patent: *Apr. 30, 2002

(54) TRANSFER LABEL COMPRISING A BACKING LAYER AND A TRANSFER LAYER, CONTAINER COMPRISING SUCH A TRANSFER LAYER AND METHOD OF REMOVING A TRANSFER LAYER FROM A CONTAINER

(75) Inventors: Thomas Lynn Brandt, Windsor; Daniel Nathaniel Willekens, Freeville, both of NY (US); Erwin Anton Rosens; Patrick Johannes Blom, both of Leiden (NL)

(73) Assignee: Heineken Technical Services B.V., Zoeterwoude (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/155,032
(22) PCT Filed: Mar. 19, 1997
(86) PCT No.: PCT/NL97/00138
    § 371 Date: Dec. 14, 1998
    § 102(e) Date: Dec. 14, 1998
(87) PCT Pub. No.: WO97/35291
    PCT Pub. Date: Sep. 25, 1997

(30) Foreign Application Priority Data

Mar. 20, 1996 (EP) .............................................. 96200780
Aug. 12, 1996 (EP) .............................................. 96202263

(51) Int. Cl.[7] .............................. B08B 3/00; B32B 27/00
(52) U.S. Cl. ................... 428/35.7; 428/40.5; 428/41.7; 428/41.8; 428/195; 428/219; 428/332; 428/340; 428/349; 428/484; 134/10; 134/34
(58) Field of Search ................ 428/35.7, 36.9, 428/40.5, 41.7, 41.8, 426, 440, 497, 500, 195, 349, 332, 340, 219, 484; 134/10, 73, 34

(56) References Cited

U.S. PATENT DOCUMENTS

| | | | | |
|---|---|---|---|---|
| 3,868,960 A | * | 3/1975 | Cove et al. | 134/73 |
| 5,458,714 A | * | 10/1995 | Brandt et al. | 156/237 |
| 5,766,731 A | * | 6/1998 | Stein et al. | 428/195 |
| 5,824,176 A | * | 10/1998 | Stein et al. | 156/239 |
| 5,908,694 A | * | 6/1999 | Makar et al. | 428/349 |

FOREIGN PATENT DOCUMENTS

| | | | |
|---|---|---|---|
| DE | 30 37 250 A | | 4/1982 |
| EP | 0 503 112 A | | 9/1992 |
| EP | 0 510 403 A | | 10/1992 |
| WO | WO 90/5088 A | * | 5/1990 |
| WO | WO 90 05088 A | | 5/1990 |
| WO | WO 93 16877 A | | 9/1993 |
| WO | WO 93/16877 A | * | 9/1993 |

* cited by examiner

Primary Examiner—Rena L. Dye
(74) Attorney, Agent, or Firm—Pearne & Gordon LLP (57) ABSTRACT

The invention relates to a transfer label comprising a backing layer and a transfer layer which is releasably attached to the backing layer. From transfer to a container, the transfer layer is detached from the backing layer. After attachment to a container, the transfer layer can be removed in an aqueous liquid under turbulent soaking conditions at a temperature of not more than 100° C., preferably not more than 70° C. During these conditions, the transfer layer breaks up in at least four parts wherein each part is not smaller than 5 micrometers. The transfer layers is detached from the container with a soaking time of not more than 20 minutes, preferably not more than 10 seconds. The transfer label according to the present invention has a very high adherence during storage and use conditions, and can be rapidly removed from a container such as a reusable crate for bottles, in an economic manner.

32 Claims, 4 Drawing Sheets fig-3 fig-4 fig-5 fig-6 fig-7 fig-8 fig-10 fig-11

TRANSFER LABEL COMPRISING A BACKING LAYER AND A TRANSFER LAYER, CONTAINER COMPRISING SUCH A TRANSFER LAYER AND METHOD OF REMOVING A TRANSFER LAYER FROM A CONTAINER

BACKGROUND OF THE INVENTION

The invention relates to a transfer label comprising a backing layer and a transfer layer releasably attached thereto, which transfer layer can be detached from the backing layer for transfer to a container. The invention also relates to a container, in particular to a plastic crate, comprising such a transfer layer and to a method of removing such a transfer layer from a container.

It is known in the packaging technology art to label containers such as plastic crates by providing a non-removable permanent image by a silk screen method. Such labels offer a highly durable finish with two or three color availability. This technique however offers limited colors, lacks the improved graphics that other labelling techniques offer, is not flexible in its ability to have graphic changes to meet market strategies leading to large inventories of obsolete units, and tends to show signs of wear after about four trips.

When removable inks are to be applied to re-usable plastic crates by a screen printing or a tampon printing process, the inks have to be applied in the bottling plant, such as a brewery, which may lead to problems with respect to registration. Upon removal from the crates by means of crate washers, the inks will be dissolved in the washing liquid and in this way contaminate the crate washers. Furthermore the speed of application is limited, and curing of the inks requires a lot of space and long storage times prior to delivery.

A second way of labelling containers encompasses gluing printed paper labels to containers such as plastic crates or bottles at the time of filling and sealing. This type of labels however offer little resistance to label damage from handling and exposure to moisture (wrinkling). Furthermore, paper labels are difficult to remove from crates, and tend to clog the crate washers available today. Upon removal of paper labels from plastic crates, a glue residue may be left on the crates.

A third technique for labelling containers, in particular glass bottles is based on the principles as described in WO 90/05088. In this publication, a method of labelling bottles is described which provides a durable, highly impact resistant label and yet permits high definition label printing. A transfer label comprising a removable backing layer is provided which backing layer is reverse printed with a vinyl or acrylic ink which is cured and overprinted with adhesive. The label is applied to the container with its adhesive surface in contact therewith. The backing layer is separated from the transfer layer of the label for instance by the application of heat to either the container, the label or to both. The labelled container is then applied with a coating which is subsequently cured. The cured coating provides the required degree of impact resistance and durability. The disadvantage of permanently attached labels, is that when these labels get scratched or otherwise damaged, they cannot be easily removed from the bottles. Also, it is not possible to provide the same containers each time with new and/or different labels, which is desirable for promotional activities.

It is an object of the present invention to provide a transfer label which comprises a transfer layer that has good adherence to a container during storage and use, but which can also easily be removed from the container for replacing the label by a new and/or different labels.

It is another object of the present invention to provide a transfer label with an attractive appearance, which can be printed in a large variety of designs and colors and which can be removed from the container in an environmentally friendly manner.

It is a further object to provide a returnable crate system which can be provided with attractive labels, that can be easily and economically be removed and re-applied. The labels should be applied and removed at relatively high speeds.

SUMMARY OF THE INVENTION

These and other objects are achieved by the transfer label according to the present invention which is characterized in that the transfer layer, after attachment to a container and under turbulent soaking conditions in an aqueous liquid of a temperature not more than 100° C., preferably not more than 70° C., breaks up in at least 4 parts, each part not smaller than 5 micrometers and is detached from the container within a soaking time of not more than 20 minutes, preferably not more than 20 seconds. Surprisingly it was found that the advantageous properties of good adherence of the transfer layer to the container during storage and use, and easy removability for re-labelling purposes was provided by labels which break up during soaking conditions without dissolving in the soaking solution. Without wishing to be bound by any theory, it is supposed that the breaking up of the transfer layer during removal by soaking, provides for an increase in the number of positions of the label where the soaking solution can penetrate and attack the interface of the container and the label and can hence detach the label from the container. Hereby a very rapid removal of the label from the container is achieved at modest temperatures. As the label disintegrates into smaller fragments, these fragments can be removed from the soaking solution by a simple sieving process without the labels dissolving in the soaking solution. Hereby no contamination of the wash solution occurs, and effluents to the surroundings of ink and other label parts can be prevented.

During the wet removal process, not more than 10% by weight of the ink in a transfer layer is dissolved in an alkaline wash solution. Hereby it is prevented that the containers are discolored by the inks. Furthermore, the ink levels in the wash solution remain low enough to not effect the aerobic and anaerobic treatment in the waste water treatment plants. The low concentrations of inks in the wash water prevent accumulation of metals in the sludge of the waste water treatment plants, such that this sludge will not have to be treated as chemical waste under government regulations.

Surprisingly it was found that the transfer labels which break up into pieces in the soaking solution according to the present invention can be very rapidly removed using conventional crate washing apparatus, which normally is used to remove dirt and/or paper labels from re-usable plastic crates for containing bottles. A transfer label according to the present invention can for instance be removed from a plastic crate within ten (10) seconds, compared to a removal time of several minutes or more for conventional paper labels. Still the adherence of the transfer label according to the invention to a container, preferably to a re-usable plastic crate for bottles during in-use conditions and its scratch resistance are very good compared to conventional paper labels.

Although it is preferred to use the transfer layer according to the present invention on re-usable plastic crates, the label can also be used in combination with plastic bottles, such as PET-bottles, plastic food trays, glass bottles and the like.

A preferred transfer label according to the present invention comprises a transfer layer which is permeable for the soaking liquids.

With "permeable" it is meant that a transfer layer has a water uptake value after 3 hours between 0.0 and 100 $g/m^2$, preferably about 5 $g/m^2$, in water at room temperature. Such labels have a water vapor transmission rate between 50 and 750 $g/m^2$, preferably about 600 $g/m^2$ after 24 hours for water at room temperature.

The transfer layer may comprise a cover layer overlaying the ink pattern, which cover layer forms the outwardly facing surface upon attachment of the transfer layer to a container. The cover layer may for instance be formed by an acrylic wax coating. The cover layer may be a continuous layer, or may be discontinuous and printed in register with the ink pattern. The acrylic wax cover layer can very advantageously be penetrated by for instances a 0.5% NaOH-solution, while providing a sufficient barrier to penetration of moisture during storage and use-conditions of the label on a container. Labels according to the present invention which combine sufficient durability with quick and economic removal have a pencil hardness between 1N and 7N in the dry state and a pencil hardness less than 0.5 N after a soaking time between 1 minute and 15 minutes in water at 20° C.

In a further embodiment of the transfer label according to the present invention, the ink pattern is discontinuous such that areas of reduced thickness are formed in the transfer layer. In the washing process, these areas of reduced thickness, for instance between separate zones of the ink pattern, can form natural lines of weakening such that break-up of the label in these areas can more easily occur.

The transfer layer preferably comprises an adhesive layer, the tack of which is at least reduced by contact with the soaking liquid. According to a preferred embodiment, the adhesive is dissolved by the soaking liquid. Preferably this adhesive layer is discontinuous and is printed in register with the ink pattern.

A suitable transfer label has a transfer layer with a thickness of not more than 30 micrometers, preferably not more than 20 micrometers.

The adhesive layer lay down weight is not higher than 10 $g/m^2$, preferably around 3–6 $g/m^2$. These weights provide good adhering of the label during use and allow for break-up of the label in parts during the wash process.

In one embodiment the labels according to the invention are applied to returnable crates. The need for returnable crates is a direct result of industry preference and government legislation with regard to returnable (refillable) containers in various parts in the world instead of one way packaging. In this type of recycling environment a whole new market has been created for the handling of packaged beverage containers. This is presently true for both refillable PET and glass bottle containers. By use of the transfer label according to the present invention a single, blank crate can be used which can in an easy and inexpensive way be provided with an image imprint which can also easily be removed after the crate is returned to the bottle line for refilling.

Containers being provided with a transfer layer according to the present invention can be "cleaned" very rapidly in a conventional crate washing station with cleaning times per container below 1 minute, preferably below 10 seconds at temperatures below 100° C., preferably below 70° C. The soaking solution is pumped through a sieve which collects the pieces of the broken up labels. The sieves are periodically cleaned and the label pieces are removed from the sieves of the washing station.

According to a preferred embodiment a transparent protective cover layer is attached over the transfer layer upon or after attaching the transfer layer to the container. This cover layer or coating improves the resistance of the label against environmental influences without impairing its break-up properties during wash conditions. A preferred material for the protective coating is compatible with the material of the ink used in the transfer layer. More preferably all materials, adhesive, ink and protective coating are based on acrylate polymers. In order to improve the durability of the label further, without impairing its break-up properties during wash conditions, one or more heat treatments may be given after application of the label to cause a shrinking of at least parts of the transfer layer, to provide a coalescence of the materials of the various layers. This results in an improved service life without deteriorating the wash-off behaviour of the transfer layer.

A label according to the present invention that combines sufficient durability during storage and use with quick and economic removal has preferably been heat treated after application to the container at a temperature between 40° C. and 100° C., preferably between 50° C. and 90° C.

By carefully selecting the composition of the label, the use of a protective coating and the nature of the post treatment (heat treatment) it is possible to steer the properties of the transfer layer, especially with respect to the behaviour during washing.

The selection of the adhesive to be used in adhering the label image to the container surface will influence the wash-off properties. The adhesive must have been activated prior to or during application of the transfer layer to the container. An easy and generally preferred method of applying the image is through the use of heat activatable adhesives that have been applied to the image in the form of a reverse printed label. Other methods include the use of adhesive that can be activated through radiation, chemicals, electron-beam, micro-wave, UV and the like. It is also possible to use adhesives that can be activated through photo initiation, humidity, enzymatic action, pressure or ultra-sonic treatment.

A preferred adhesive has a low tack temperature, preferably between 60° C. and 90° C., more preferably between 80° C. and 90° C. Instead of a separate layer of adhesive it is also possible to use in the transfer layer an ink which in itself has adhesive properties upon activation.

BRIEF DESCRIPTION OF THE DRAWINGS

Embodiments of a transfer label and a washing method according to the invention will be described hereafter in detail with reference to the accompanying drawings. In the drawings.

Figure 1:
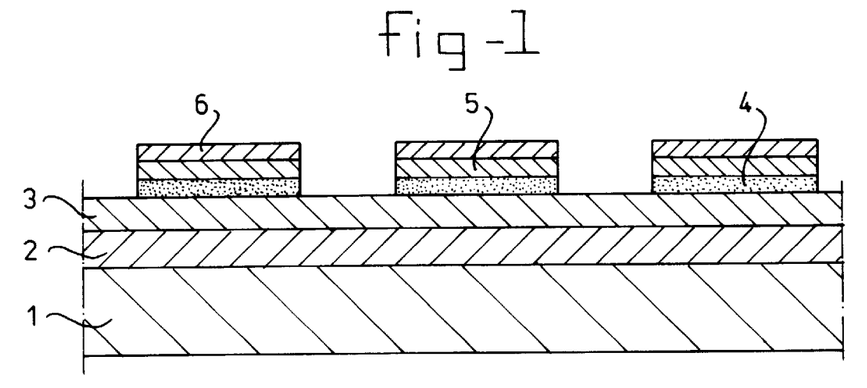
FIG. 1 shows a heat transfer label according to the invention.

The preferred embodiment of the label according to the present invention will be described first with references to FIG. 1 which shows the transfer label positioned for application. The label is printed on a backing layer, formed by a film substrate 1 which may be any thin film, but in the case described is polypropylene of 2 mils thickness. 3 is an acrylic coating which may or may not be employed, depending on the type and source of the film available. 2 is a release material which coats the film 1. In the case of the invention it is silicone which is applied at the time of film manufacture. All the printed ink material is represented by reference numeral 4. Depending on the label graphics and opacity requirements the ink materials may be as many as five 5 different colors in one or more layers, some of which may overlay another. 5 and 6 represent two (2) layers of adhesive to indicate the build up of adhesive from 0.5 to 1.5 pounds per ream, depending on the labelled surface uniformity and rigidity of the container being labelled.

Upon application, all of the printed materials are transferred from the silicone release coated film substrate 1. The transfer layer is hence formed by layers 3, 4, 5 and 6. The printed ink materials are urethane, vinyl or acrylic resin based, colored with temperature and ultra violet stable pigments. In the case of white ink, titanium dioxide is the pigment of choice. Pigment particle size ranges from three (3) to five (5)μ. The printed adhesive is a water borne organic material with an initial tack temperature of 185° F. (85° C.). This initial tack temperature is very important to the plastic labelling process because it determines the required plastic surface temperature at the time of transfer. In case the particular plastic container being labelled is a returnable crate for bottles there is no support of the inside surface. Hence it is desired to maintain the plastic of the crate below 200° F. (93° C.) to avoid distortion of the surface by reaching its point of deformation during the label transfer.

Figure 2:
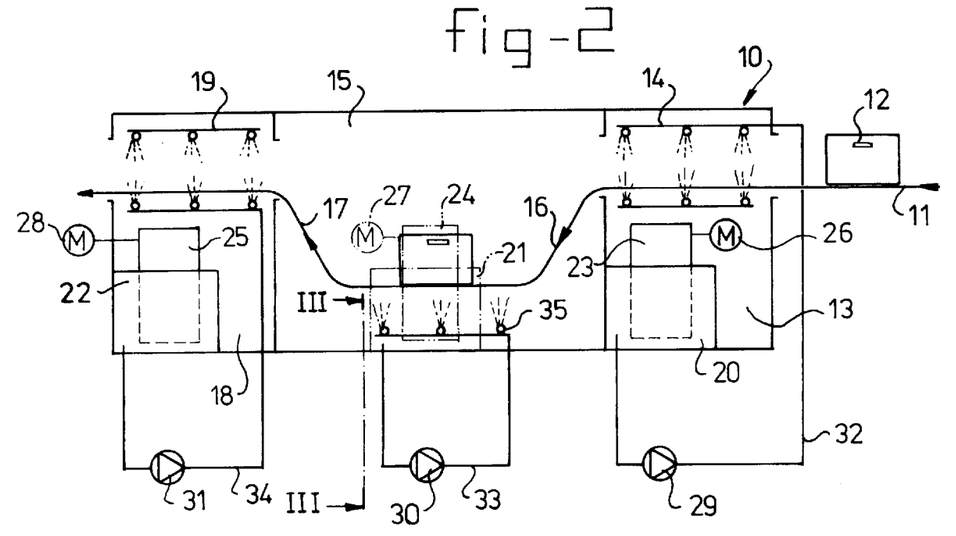
FIG. 2 shows a washing device for removal of a transfer layer according to the present invention from a container, in particular from a plastic crate.

FIG. 2 shows a schematic side view of a crate washing apparatus for removing the transfer layers according to the present invention from crates 12 that are supplied to the crate washer 10 via a transport conveyor 11. Crates 12 are first transported to pre-rinsing station 13 and sprayed with a pre-rinsing solution which is applied from a number of nozzles 14 located above and below the transport conveyor 11. The speed of the conveyor 11 is such that the dwell time of the crate 12 in the pre-rinsing station is between 6 and 8 seconds. The temperature of the pre-rinse solution is 60° C. The pre-rinse solution preferably comprises a 0.5% NaOH solution.

After passing through the pre-rinsing station 13, the crates are transported through a soaking station 15 via a downwardly sloping section 16 of the conveyor 11. The dwell time of crate in the soaking station is between 10 and 40 seconds. In the soaking station, the crate is completely submerged and a soaking solution is recirculated in the soaking station 15 by means of nozzles 35 to cause turbulent soaking conditions.

The turbulent soaking conditions may for instance include recirculating the liquid from the soaking station 15 via the nozzles 35 at a rate of 60 m³/h for a total volume of the soaking solution of 5 m³. It is important that the transfer layers are completely removed from the crates 12 in the soaking station 15, without any pieces remaining on the crates. Such remaining pieces would, when dried, adhere firmly to the crates and form an undesired contamination of the crate surface.

From the soaking station 15, the crates are transported via the upwardly sloping conveyor track 17 to an after-rinse station 18. The after-rinse solution may comprise water at a temperature of 30° C. The dwell time of the crates in the after-rinse station 18 is between 6 and 13 seconds.

Connected to each rinsing station 13, 18 and to the soaking station 15 are sieving sections 20, 21 and 22. Each sieving section comprises a rotating belt sieve 23, 24, 25, which are driven by motors 26, 27, 28 respectively. Pumps 29, 30 and 31 draw the rinsing liquid and the soaking liquid from each perspective station through the rotating sieve belts 23, 24, 25 a rate of for instance 60 m³/h. The sieved liquids are recirculated back to nozzles 14 and 19 in the pre-rinse and after-rinse stations 13, 18 respectively and to the soaking station 15.

Figure 3:
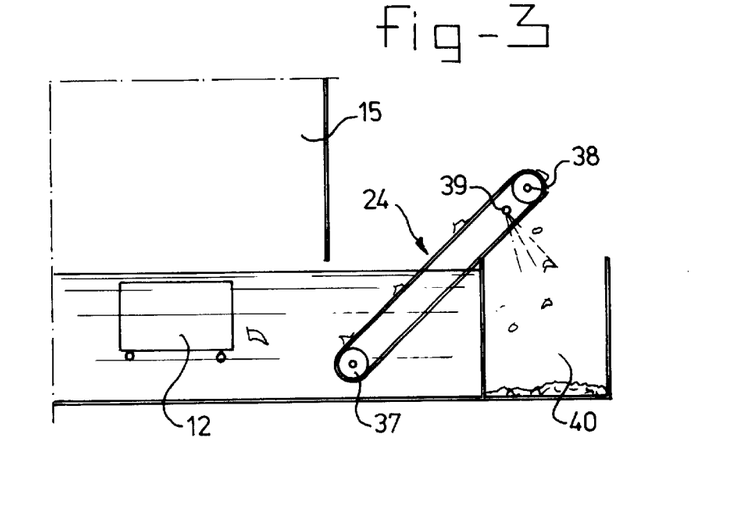
FIG. 3 shows a cross-sectional view of the washing device according to FIG. 2 along the line III—III.

FIG. 3 shows a cross-sectional view along the lines III—III of FIG. 2. It can be seen that the sieve belt 24 is rotated around two rollers 37, 38. The top end of the sieve belt 24 extends above the level of the soaking liquid in the soaking station 15. The sieve belt 24 comprises a dual layer belt-like sieving element with a mesh size of 2 millimeters. During operation it is important to continuously rotate the sieve belt 24 to prevent the label pieces from the transfer layers that break up into pieces in the soaking station 15, from clogging the sieve belt. A spraying nozzle 39 cleans the surface of the belt-like sieving elements by high pressure water or air jets. The removed label elements are collected in a collection compartment 40.

It was found that a very efficient removal of labels from crates 12 is achieved by using 0.5% NaOH-solution in the pre-rinsing station 13 and the soaking station 15. However, it is also possible to apply a pre-treatment material onto the labels, prior to entry into the crate washer 10, which acts to soften the label prior to entry into the crate washer. For instance, a surface active component can be sprayed onto the crates 12 when travelling to the crate washer 10. It is also possible to apply a gel-like material of a chemical composition which starts attacking the label prior to entry into the crate washer 10. In such a case it may be possible to use water only in the crate washer 10, instead of the alkaline solution.

Figure 4:
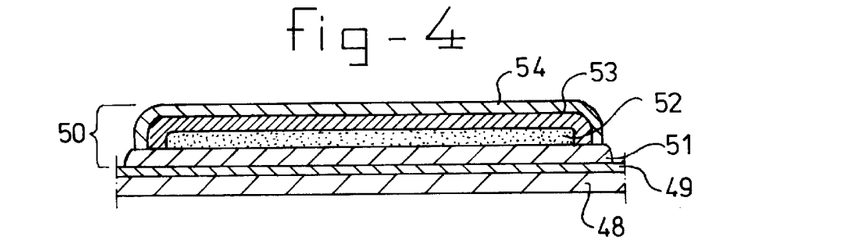
FIGS. 4–8 show various embodiments of the transfer layer of a transfer label according to the present invention, FIG. 9 schematically shows a method of applying the transfer layer according to the present invention, to a returnable crate, and FIGS. 10 and 11 graphically show the removal time of a transfer layer at different post heat temperatures without a wax cover layer and with a wax cover layer respectively.

FIG. 4 shows a transfer label according to the present invention comprising a carrier, or backing layer 48 formed by for instance a two-mil thick polypropylene film. A silicone release layer 49 is located on the carrier layer 48. On the silicone layer 49 a transfer layer 50 is placed which consists of a top containment layer 51, a continuous ink layer 52, a bottom containment layer 53 and an adhesive layer 54.

Upon attachment of the transfer layer 50 to a container, the carrier layer 48 and the silicone layer 49 are removed under application of heat and pressure. The adhesive layer 54 bonds the transfer layer 50 to an underlying container surface, and the outwardly facing layer is formed by the top containment layer 51.

The label carrier 48 which is provided with the electron beam-cured silicon layer 49 can be for instance a polypropylene film of 1–3 mil thickness as supplied by Mobil Chemical, Films Division, Rochester, N.Y. Prior to printing of the top containment layer 51, onto the silicone layer 49, the silicone surface must be corona treated. A corona treatment will allow uniform wetting of the print materials and still allow for release of the transfer layer 50. Preferably the corona treatment is applied to the carrier layer 48 and silicone layer 49 shortly before the first print of the top containment layer 51 is applied. A target treatment level should be approximately 30% of 3.5 kW.

During handling of the silicone-coated carrier layer 48, care is taken not to scratch the silicone layer 49. Scratching the silicone layer 49 would allow the top containment layer 51 to contact and adhere to the underlying polypropylene film 48 which would adversely effect the transfer of the transfer layer 50 during application.

The top containment layer 51 consists for instance of unpigmented ink, and has several functions. Firstly it slows or prevents water penetration into the underlying ink layer 52. As the layer 51 is printed wider than the underlying ink layer 52 it forms part of an envelope which totally surrounds the colored ink layer 52. Furthermore the top containment layer 51 provides a consistent medium between the ink and the silicone release surface 49. The layer 51 is very important to the overall transferability of the label and should be applied at a weight of at least 1.4 g/m$^2$. It is important that upon application of the top containment layer 51 this layer is free of airbubbles and pinholes. Furthermore the top containment layer must be dry before printing the subsequent ink layer 52 thereon.

After printing the top containment layer 51 onto the release layer 49, an optimum peel force of 100 g or less should be measured on the press in a standard tape peel test. Within five hours after application, the peel force of the top containment layer will be about 60% less, or 40 g. With the specified peel force, the containment layer 51 should be removed completely. A suitable material for the top containment layer 51 is available from Environmental Inks and Coatings, Morganton, N.C. under type number 1304.

Examples of a preferred ink for the ink layer 52 include a waterborne organic as available from Environmental Inks and Coatings, Morganton, N.C. under type number Aqua BW EH-31721, EH 53016, EH 90967. These inks have a high stability even at temperatures over 200° C. without discoloration or loss of adhesion.

The bottom containment layer 53 provides a strong interface between the adhesive layer 54 and the colored ink layer 52. It is formulated to chemically anchor to the ink and provide excellent wetting and bounding of the adhesive layer. The bottom containment layer 53 attaches outside the ink layer 52 to the top containment layer 51 such that a closed envelope is formed around the ink layer 52. A suitable material for the bottom containment layer 53 is available from Environmental Inks and Coatings under type number 1189.

The adhesive layer 54 can be formed by a waterborne organic material which is printed in a number of consecutive flexographic stations such as three stations, or can be flood-coated on a single station. The adhesive layer 54 may also be applied by a single gravure printing station. Preferably the adhesive 54 is heat-activated and has a low tack temperature from 80° C. up to 107° C. The preferred weight of adhesive is approximately, 3.5 g/m$^2$. A suitable adhesive is available from Environmental Inks and Coatings under type no. XP 11358.

The layers of the transfer layer 50 may be applied in a flexographic printing press with up to 10 printing stations. Five stations maybe used for printing the layers 51,53 and the adhesive layer 54 which can be composed of three separate adhesive layers. Five types of colored ink 52 may be applied using the five remaining flexographic printing stations.

Instead of a flexographic printing process, also a gravure press equiped with a corona treater may be used. Because material laydown is heavier than in the flexographic process, only three gravure printing stations may be necessary for applying the containment layers 51 and 53 and the adhesive layer 54.

Further rotary screen printing processes can be used for applying layers 51,53 and 54. Upon printing of the bottom containment layer 53, care should be taken that it extends beyond the perimeter of the ink pattern 52 but remains within the perimeter of the top containment layer 51. It is preferable that the adhesive layer 52 extends beyond the perimeter of the bottom containment layer 53 and matches the perimeter of the topmost containment layer 51.

Figure 5:
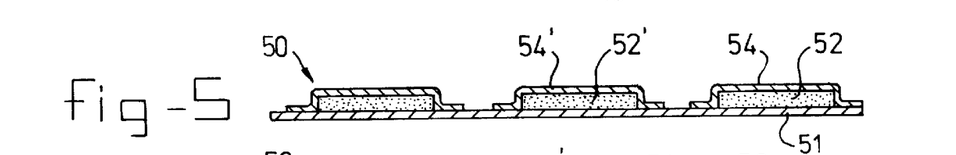

In the embodiment of FIG. 5, the ink layer 52,52' and the layer of adhesive 54,54' are discontinuous. The adhesive layer 54,54' is printed on the ink pattern 52, 52' such that it has a small overlap with the printed areas. The adhesive layer 54,54' in this embodiment attaches to the continuous top containment layer 51. In this way, to break up the transfer layer 50, only the top containment layer 51 needs to be ruptured, so that the soaking solution can quickly penetrate towards the adhesive layer 54 and the transfer layer 50 easily becomes detached.

Figure 6:
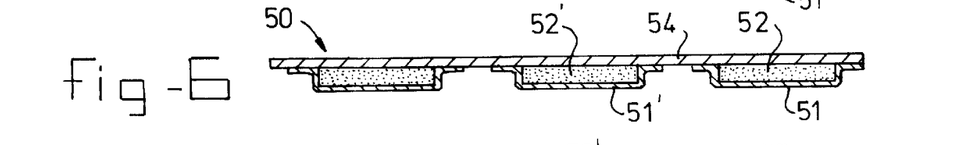

In the embodiment of FIG. 6, the adhesive layer 54 is a continuous layer. The top containment layer 51,51' been printed in register with the ink pattern 52, 52' such that it has a slight overlap with the ink areas. Again the ink pattern 52,52' is encased between the containment layer 51,51' and the adhesive layer 54. The ink pattern 52, 52' can be formed by individual letters, individual words or individual patterns such as dots, squares, etc. The minimum dimension of the individual ink patterns may be as small as for instance 0.5 mm.

Figure 7:
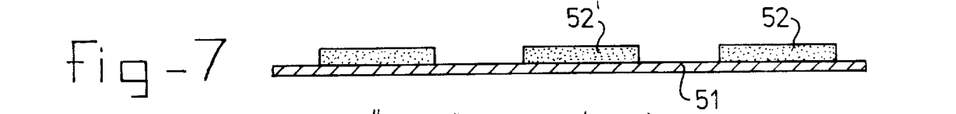
Figure 8:
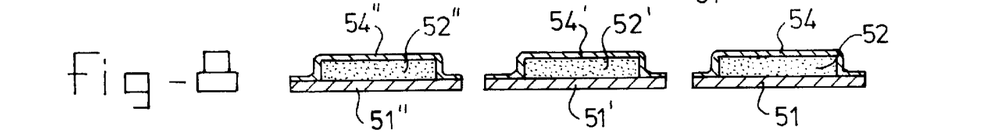

In the embodiment of FIG. 7, a self-adhesive ink 52, 52' has been used which directly bonds to a container surface. The ink is overlain by a continuous top containment layer 51. Finally in FIG. 8, both the containment layer 51, 51' and the adhesive layer 54,54' are discontinuous and are printed in register with a discontinuous ink pattern 52, 52' Again the ink is encased in envelopes between the layers 51 and 54. Access to the adhesive layers 54,54' by the soaking solution is very good through the open areas between the pattern of the layers 51,52,54,51',52',54' and 51", 52" and 54".

FIG. 9 shows a schematic view of the application process of a transfer layer from a transfer label according to the invention to a returnable crate 59.

The label application process will now be described in the order of progression. Station 60 shows the step of surface treatment and temperature stabilization by means of a pre-heating treatment using a flame heater or burner 60'. For adhesion of two polymeric materials to occur, many factors must be considered such as cleanliness, pressure, temperature, contact time, surface roughness, movement during bonding and adhesive film thickness. An additional important consideration is the critical surface tension. The commonly accepted method of measuring the critical surface tension is with a Dyne solution, which is well known. For most adhesive applications the critical surface tension of polyethylene is 31 Dynes per centimeter 31$10^{-5}$ N/CM. A series of tests were performed which demonstrated for best adhesion of the adhesive previously described to the polyethylene surface, a treatment level of 60 to 70 Dynes per centimeter (60.$10^{-5}$ N/CM to 70.$10^{-5}$ N/KM) was necessary. Further testing of commercially available equipment showed that flame treatment optimized both capital cost, operating cost and time required to achieve the required critical surface treatment.

For the adhesive to achieve and maintain tack quickly it is necessary to heat the polyethylene crate 59 at station 61 before the label adhesive is in contact with it. To avoid deforming of the container, it is desirable not to heat the surface over 200° F. (93° C.). As the surface temperature leaving the flame treatment is approximately 125° F. (52° C.), it is necessary to heat the surface approximately 75° F. (24° C.) at station 61. Here again, many options are available for heating. Hot air, additional flame heaters, gas fired infra-red panels and electric ceramic panels were all tested and found to be either too slow or difficult to control. It was found that an electrically heated flat fused quartz emitter plate 61 with zonal band control for localized label transfer would provide maximum free air transmission of infra-red energy without the effects of ambient environmental factors. With an emissivity of 0.9 for polyethylene a desired emitter plate temperature of between 1652° F. (900° C.) to 1725° F. (940° C.) will emit the most efficient wavelength (2.5 to 3.2 pm) of infra-red energy for peak absorption. The unit tested was rated at 60 watts per square inch. The time to heat the polyethylene surface the necessary 75° F. (24° C.) was 4.5 seconds at a distance from the emitter plate of 2.5 centimeters.

Station 62 illustrates the method of label application whereby the printed ink materials are transferred from the polypropylene film substrate to the polyethylene surface utilizing the tactile characteristics of the heat activated adhesive to overcome the bond of the transfer layer to the corona treated silicone coating. The factors that influence transfer are time to contact, temperature and pressure applied during contact and film tension during contact particularly tension of the film after ink release. The diameter of pressure roll 63 is also a factor but not a variable. For this application the roll diameter is 38 mm. The roller 63 is made of silicone rubber over a steel core, with rubber durometer ranging from 50 Shore A to 80 Shore A. It should be noted that distortion (flattening) of the rubber roller is less at higher durometer, consequently the contact area is less and the transfer pressure is greater. This is important at the higher line speeds where contact time is minimized. Thus a crate moving 18.3 meters per minute (60 feet per minute) past a roller of 38 mm diameter will have a contact time of 1 millisecond per 1 degree of roller rotation where there is no roller distortion.

Roller pressure is provided by an air cylinder 64 activated by a conventional solenoid valve which in turn is operated by two (2) proximity switches, one to advance the roller and the other to retract. Other means, such as mechanical linkage are obvious and will not be listed here. The pressure is distributed across the length of the cylinder and for this particular label, transfer ranges from 12 to 17 kilograms per centimeter of roller length are desirable.

Thus the invention results in the film being advanced at exactly the same rate as the crate is moving past the roller by virtue of the heat activated adhesive adhering to the high energy crate surface. The pressure roller 63, which rotates freely, maintains the same tangential speed as the linear speed of the film and crate. Thus the ink is transferred completely and without distortion.

For purposes of fast and complete adhesion the pressure roller 63 is molded to a hollow core. Suspended within the hollow core is a resistance heater operated through a controller. The heating element, rated at 500 W, will maintain the roller surface at any predetermined temperature. For purposes of the invention, the roller surface temperature range between 250° F. and 370 ° F. (120° C. and 190° C.).

Many silicone coated polymer films may be used for the printed substrate. High temperature films such as polyester may be operated in continuous contact with the heated roller. Low temperature films such as polypropylene must be prevented from contacting the heated roller during pauses in the labelling operation. To accomplish this, film guides 65 are used to support the film when the roller is retracted. The guides 65 are mounted to maintain a clearance of approximately 13 mm between the guides and the labelled surface. At the same time the roller is retracted approximately 13 mm behind the film. By maintaining those clearances, stretching and distortion of the film such as polypropylene is avoided. High temperature films would not require the guides.

It has also been discovered that film tension, especially on the film exit side of the roller, is important to complete ink transfer. Through trials, it was found a continuous tension of approximately 2.5 kilograms is useful. This is achieved through a spring loaded dancer arm and roller.

Conventional nip rollers and stepping motors are used to advance the film to the next label and position it accurately, using a printed mark to trigger an optical scanning device.

Protection of the ink against scratching by casual handling as well as insuring its weatherability when subjected to outdoor storage is achieved with the application of an acrylic based wax water emulsion at station 66. This is applied by a roll applicator 68 which is supplied from a wet roller with a controlled amount of coating. Control is achieved with a doctor blade. The coating extends well past the edges of the ink pattern and seals the edges from intrusive moisture.

The final processing step is to coalesce the layers of the coating, label ink, and adhesive at station 67 by means of flame heater 67' and also to inter diffuse the adhesive layer with the polyethylene substrate formed by the crate 59. This discovery was made through extensive trials of many heating systems. As flame treatment was discovered to be the best technique that would provide the required surface energy for label adhesion, so it was discovered that flame treatment of the label and coating composite was the best technique that would develop the required water immersion durability without sacrificing mechanical properties or altering the visual characteristics of the applied label, or distorting the polypropylene crate 59.

To illustrate the various properties which influence the adherence and the washability of the preferred transfer layer according to the present invention, the following tests were carried out, including a washing trial, a pencil scratch test, a water uptake/release test and a water vapor transmission rate test as described hereafter.

Washing Trial

To determine the optimum washing conditions for the labels according to the present invention, a transfer layer 50 having the configuration as shown in FIG. 4 was applied to a polyethylene crate. The dimensions of the label were about 10 by 10 centimeter and the adhesive layer 54 was a 100% urethane adhesive with a tack temperature of 79° C. The labels were applied to the crate with a temperature of roller 63 in FIG. 9 of 155° C. at a roller pressure of 2.5 bar. The pre-heat temperature of the crate (in stations 60 and 61 of FIG. 9), was 75° C. The speed of the crates 59 through the label applicator was 40 crates per minute. To determine the influence of the post-treat temperature with which the crates after label application were heated in station 67 of FIG. 9, post-treat temperatures of 40° C., 65° C. and 90°0 C. were used. After label application the crates were stored for at least 24 hours at a temperature of 20° C. The crates to which a label was applied, were thereafter soaked in a 0.5% NaOH-solution at temperatures of 20° C., 50° C., and 70° C.

The soaking of the crates was carried out in a soaking bath of 20 liters without turbulence, for such a soaking time (10–50 seconds) that after spraying the soaked crate with a showerhead at a rate of 6 liters/minutes, the label was completely removed within 2 seconds.

A second set of crates was prepared wherein after label application, a coating layer of wax was applied, such as at station 66 of FIG. 9.

Figure 10:
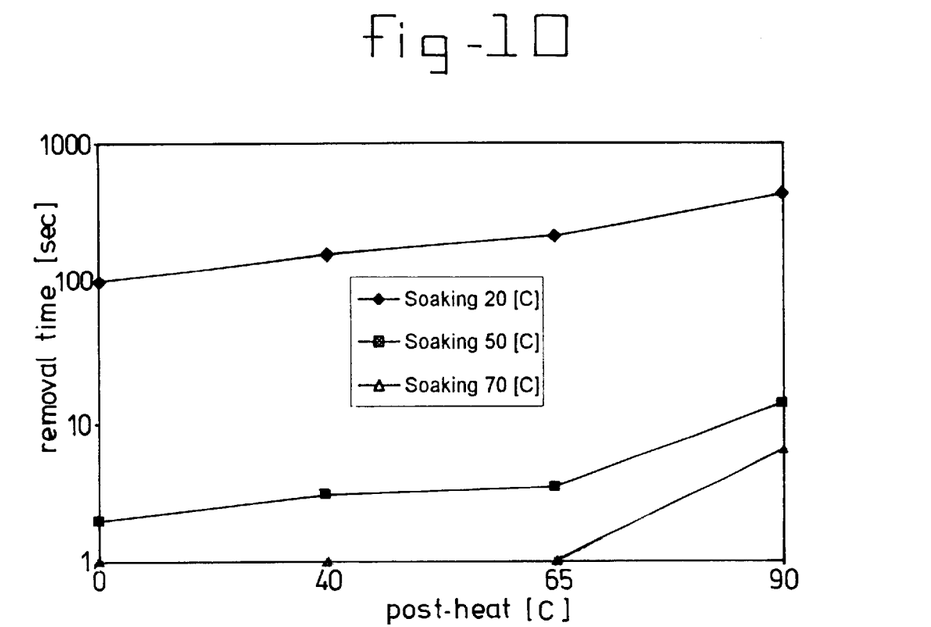

The results of the soaking times required for label removal within 2 seconds, versus the post-treatment temperature, are given in tables I and II. From table I, the results of which are displayed graphically in FIG. 10, it can be seen that for labels to which no wax layer was applied, the soaking time decreases drastically at temperatures of the soaking solution above 20° C. For post-heat temperatures of 90°, the durability of the label was increased and the soaking times remain above 5 seconds.

TABLE I crate washing trial
(no wax layer applied)

0.5% caustic

| T (° C.) | postheat (° C.) | Time (sec) | Time (sec) | Time (sec) | Average (sec) |
|---|---|---|---|---|---|
| 20 | none | 90 | 120 | | 105 |
| | 40 | 180 | 150 | | 165 |
| | 65 | 210 | 240 | | 225 |
| | 90 | 480 | 420 | | 450 |
| 50 | none | 2 | 2 | 2 | 2 |
| | 40 | 3 | 3 | 3 | 3 |
| | 65 | 3 | 3 | 4 | 3.4 |
| | 90 | 15 | 14 | 13 | 14 |
| 70 | none | 1 | 1 | 1 | 1 |
| | 40 | 1 | 1 | 1 | 1 |
| | 65 | 1 | 1 | 1 | 1 |
| | 90 | 6 | 6 | 7 | 6.3 |

It was found that an optimum post-heat temperature was between 65° C. and 90° C. At a post-heat temperatures below 65° C., too little coalescing of the applied transfer layer was achieved, such that the applied transfer layers had insufficient durability and could be too easily removed during storage and use. At post-heat temperatures higher than 90° C., the durability of the transfer layer became too large, and quick removal times could not be achieved in an economically feasible manner. During the spraying period with the showerhead, it was observed that after soaking, the labels detached from the crate and broke up in several (2 to 4) pieces.

Figure 11:
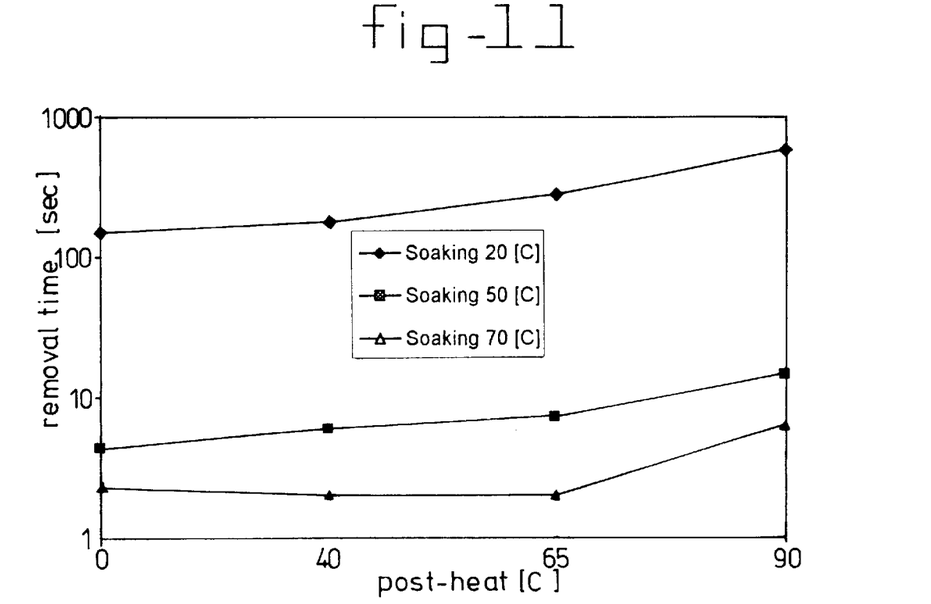

When prior to the flame treatment step at station 67 in FIG. 9 a wax layer is applied at station 66, the durability of the labels is improved, and soaking times are increased. From table II it can be seen that for a 0.5% caustic solution, the wax coating leads to longer soaking times. The results of table II are displayed in graphical form in FIG. 11.

TABLE II

Crate Washing Trial
(with wax layer applied)

0.5% caustic

| T (° C.) | postheat (° C.) | Time (sec) | Time (sec) | Time (sec) | Average (sec) |
|---|---|---|---|---|---|
| 20 | none | 150 | 150 | | 150 |
| | 40 | 180 | 180 | | 180 |
| | 65 | 300 | 270 | | 285 |
| | 90 | <600 | | | 600 |
| 50 | none | 4 | 4 | 5 | 4.3 |
| | 40 | 6 | 6 | 6 | 6 |
| | 65 | 7 | 7 | 8 | 7.3 |
| | 90 | 13 | 14 | 16 | 14.3 |
| 70 | none | 2 | 2 | 3 | 2.3 |
| | 40 | 2 | 2 | 2 | 2 |
| | 65 | 2 | 2 | 2 | 2 |
| | 90 | 6 | 6 | 7 | 6.3 |

It was observed that by trying to remove the labels as were tested in the washing trial described above, solely with high pressure water jets at 20° C. and at a pressure of 120 bar, at a conveyor speed of 15 meters per minutes and a spraying angle of 90° at a distance of 10 centimeters, no label removal was achieved. Even for labels without any wax coating and no post-heat treatment, no removal by means of high-pressure water jets was possible.

Pencil Scratch Test

The purpose of the pencil scratch test is to identify the minimum and maximum durability of a label which can be obtained by taking different measures such as the use of a covering wax layer and heat treatment to cause coalescing of the label layers. Crates with labels which were applied with different post-heating temperatures, with and without wax, have been tested.

The labels were the same labels as used in the washing trial described above, and were applied to the crates under the same conditions.

The pencil scratch tests were carried out with a "scare resistance test model 435" supplied by Erichsen (PO Box 720, D-5870 Hemer Germany).

During the scratch test, a pencil with a plastic insert was used to scratch the label at an angle of 90° horizontally in the middle thereof.

After label application, the crates were stored for at least 24 hours at a temperature of 20° C. Prior to scratching, the crates were soaked in a water without turbulence at 20° C. The results of the scratch test are given in table III and table IV in which the scratch results are given in N.

TABLE III

Pencil Scratch Test (in N) label without wax coating

| Post-heat Temperature (° C.) | soaking time (min) | | | | | | | |
|---|---|---|---|---|---|---|---|---|
| | 0 | 0.5 | 1 | 1.5 | 2 | 2.5 | 3 | 3.5 |
| none | 1 | 0.4 | 0.2 | 0.1 | | | | |
| | 1 | 0.3 | 0.2 | 0.1 | | | | |
| 40 | 1.3 | 0.9 | 0.2 | 0.1 | | | | |
| | 1.1 | 0.7 | 0.2 | 0.1 | | | | |
| 65 | 1.1 | 0.7 | 0.2 | 0.1 | | | | |
| | 1 | 0.5 | 0.1 | 0.1 | | | | |

TABLE III-continued

Pencil Scratch Test (in N) label without wax coating

| Post-heat Temperature (° C.) | soaking time (min) | | | | | | | |
|---|---|---|---|---|---|---|---|---|
| | 0 | 0.5 | 1 | 1.5 | 2 | 2.5 | 3 | 3.5 |
| 90 | 1.5 | 1.2 | 0.8 | 0.6 | 0.6 | 0.4 | 0.2 | 0.1 |
| | 1.1 | 1 | 0.8 | 0.6 | 0.5 | 0.3 | 0.2 | 0.1 |

TABLE IV

Pencil Scratch Test (in H) label with wax coating

| Posttreat (° C.) | soaking time (min) | | | | | | | | | | | | | |
|---|---|---|---|---|---|---|---|---|---|---|---|---|---|---|
| | 0 | 0.5 | 1 | 1.5 | 2 | 2.5 | 3 | 4 | 5 | 6 | 7 | 8 | 9 | 10 |
| none | 5 | 3 | 1.4 | 0.5 | 0.3 | 0.2 | 0.1 | | | | | | | |
| | 5 | 3 | 1.5 | 0.7 | 0.4 | 0.2 | 0.1 | | | | | | | |
| 40 | 5 | 2.8 | 1.3 | 0.4 | 0.3 | 0.1 | | | | | | | | |
| | 5 | 3 | 1.4 | 0.6 | 0.4 | 0.2 | 0.1 | | | | | | | |
| 65 | 2.5 | 1.2 | 0.5 | 0.3 | 0.2 | 0.1 | | | | | | | | |
| | 5 | 2.9 | 1.3 | 0.5 | 0.2 | o.1 | | | | | | | | |
| 90 | 5 | 4 | 2.5 | 1.3 | 0.7 | 0.7 | 0.6 | 0.4 | 0.4 | 0.4 | 0.3 | 0.3 | 0.3 | 0.3 |
| | 5 | 1 | 2.8 | 1.5 | 0.8 | 0.7 | 0.5 | 0.3 | 0.3 | 0.3 | 0.2 | 0.2 | 0.2 | 0.2 |

From table III and IV it can be seen that the post-heat flame treatment does not seem to influence the scratch resistance of the transfer layers significantly in the dry state. The durability of the transfer layer however is increased by the post-heat flame treatment, as is apparent from the higher pencil hardness after soaking. From table IV it appears that application of a wax layer covering the label, improves the scratch resistance of the dry label significantly. It was found that for high post-heat flame treatment temperatures of 110° C. in combination with a wax coating, a scratch force of 8 Newton was achieved. Labels with a pencil hardness of 8 Newton are considered to be semi-permanent labels which cannot be removed in an economically feasible manner.

Also at post-heat temperatures above 90° C., problems occurred during labelling as at these temperatures the polyethylene crates became brittle after a few applications, the crate pigments were found to discolorate and deformations of the softened crates on the conveyor and the pelletlizer were found to occur.

At a post-heat temperature below 65° C., the strength of the labels was found to be insufficient for labels which did not have a wax coating. For labels without a wax coating the target pencil hardness in the dry state should be around 1.2 N and the soaking time until the scratch force drops below 0.3 Newton should be below 3 minutes. For a wax coated label, the target scratch force should be about 5 Newton in the dry state and the soaking time until the scratch force drops below 0,3 N should be below 10 minutes. Transfer layers having the above properties were found to have an optimal combination of durability and washability.

Water Uptake Test

The labels according to the present invention can be easily removed from a container, in particular from a plastic crate due to their specific water permeability which allows the soaking solution to penetrate the label, and subsequently break up the label in pieces and detach it from the container. It was found that preferred labels have a water absorption of around 5 g/m$^2$ after 3 hours in a water uptake test as described below. Labels according to the invention have a water uptake value higher than 0 and less than 100 g/m$^2$ in 3 hours. The water release of a preferred label was 4.5 g/m$^2$ within 30 minutes in the water release test as described below. Preferred labels according to the present invention will have a water release value greater than 0 (a complete barrier) and less than 100 g/m$^2$ after 3 hours.

Two samples were prepared, each sample containing 2 labels of a thickness of 12.7 microns each at 22.4° C. and 48% relative humidity, each sample having a surface area of 85.8 cm$^2$. For each sample, two labels were applied on a single piece of clear glass of 3 inch(7.62 cm)×9 inch(22.86 cm)×0.02 inch (0.05 cm). Due to the extremely low weight of the labels it was necessary to apply two labels per piece of glass to obtain a weight that would register within the range of a two decimal place electronic gram scale.

The samples were prepared as follows: the glass supports were thoroughly cleaned and placed in a heating oven until an approximate temperature of 250° F. (120° C.) was reached on the glass surface. The glass was then removed from the heating oven and placed on a silicone rubber mat. A label was immediately set on the glass and secured to the surface by the use of a silicone roller. Rolling pressure was continually applied to the full length of the label until all entrapped air was removed (approximately 5–6 back and forth motions). After the glass had cooled, the carrier film was removed. Thereafter the opposite side of the glass plates were labelled by heating a clean aluminium plate (slightly larger than the glass plate) to approximately 250° F. (121° C.) in a convective oven, then placing the glass on the surface of the aluminium plate (label surface down) which allowed the heating of the glass upper surface. The label was then applied and secured in place by the silicone roller as described above. Once again, when the glass cooled, the carrier film was removed. Next a wax coating having a dry weight of 0.043 grams was applied to the surface of both, labels. In the final step, using a propane oxidizing flame, flame treatment was applied to both labels by quickly passing the flame across the entire surface of the label sample. Once the samples were cooled the labels were ready for the Water Uptake test.

A stainless steel immersion tank of a 33.66 centimeter diameter and 24.13 centimeter height was filled with the deionized water. Care was taken that the water level was deep enough to allow total immersion of the sample. The sample was placed with the short dimension set perpendicular to the bottom of the tank. The glass supports were placed on a thin wire frame in the immersion tank. A thermocouple was installed inside the water immersion tank. After each time period, as given in table V, the sample was removed from the tank, excess surface water was blotted dry, the sample was weighted and placed back in the tank. This procedure was continued for the duration of the test. The results are shown in table V. With regard to sample 1, this sample reached it maximum absorption of 0.04 grams at the 3 hour mark and maintained this level to the 5 hour mark before giving up its ability to retain water at this level. After the 5 hour period the label lost its ability to hold water. We believe this phenomenon was caused because of label structure degradation. For sample 2, this sample also reached its maximum absorption of 0.04 grams at a 3 hour mark. At the 5 hour mark this sample was terminated from further testing in preparation for the water release test described below.

From the water uptake test, it can be deduced that a preferred label of a thickness of 12.7 microns has a water uptake value of 0.04 g/ 85.8 cm$^2$ or about 5 g/m$^2$ after 3 hours at room temperature.

TABLE V

Water Uptake Test

| Time | Sample 1 Weight in grams | Sample 2 Weight in grams | Relative Humidity (%) | Tank Water Temperature (° F.) | Room Air Temperature (° F.) |
| --- | --- | --- | --- | --- | --- |
| 8:00 a.m. | 59.77 | 59.77 | 47 | 71 | 72.4 |
| 8:10 a.m. | 59.80 | 59.80 | 47 | 71 | 72.4 |
| 9:00 a.m. | 59.81 | 59.81 | 47 | 71 | 72.4 |
| 10:00 a.m. | 59.83 | 59.83 | 47 | 71 | 72.4 |
| 11:00 a.m. | 59.85 | 59.85 | 48 | 72 | 72.4 |
| 12:00 p.m. | 59.85 | 59.85 | 48 | 72 | 72.6 |
| 1:00 p.m. | 59.85 | | 48 | 72 | 72.6 |
| 2:00 p.m. | 59.84 | | 48 | 72 | 72.6 |
| 3:00 p.m. | 59.81 | | 49 | 72 | 72.6 |

In order to calculate individual label gram weights from the data in table V, refer to the following:

Each sample incorporated the use of two labels. To calculate the weight of Sample 1 at 1:00 p.m., substract the 8:00 a.m. reading from the 1:00 p.m. reading and divide by 2 As an example:

| | |
| --- | --- |
| 1.00 p.m. reading | 59.85 |
| 8.00 a.m. reading | 59.77 |
| | 0.08/2 = 0.04 grams |

Water Release Test

Immediately after the conclusion of the above Water Uptake Test the sample 2 as prepared above was subjected to the water release test. The sample was blotted to remove access water, weighted and the data were recorded. The sample was first exposed to ambient temperature for one half hour and weighed. Half an hour after weighing the sample, it was placed in a prewarmed (53° C.) test oven (small electrically heated oven, Quieny Lab Inc., Model 20 Lab oven or equivalent). The sample was left in the prewarmed oven for more than one hour and weighted. Thereafter the sample was placed back in the test oven and remained there for 3.5 hours.

From table VI it can be concluded that the water absorbed by sample 2 was released within 30 minutes exposure to ambient room temperature and humidity (48%). In fact, the sample registered a weight loss of 0.01 grams from its original weight which could seem to indicate that the label was not thoroughly dried at installation. So a preferred label of 85.8 cm$^2$ size and 12.7 micron thickness has water release greater than 0 and less than 0.10 g/24 hours with a mean release of 0.045 g within 30 minutes given these parameters.

TABLE VI

Water Release Test

| Time | Sample 2 Weight in Grams | Room Temperature (° F.) | Relative Humidity | Oven Temperature (° C.) |
| --- | --- | --- | --- | --- |
| 12:00 p.m. | 59.85 g | 72.6 (22.6° C.) | 48 | 53.5 |
| 12:30 p.m. | 59.76 g | 72.6 (22.6° C.) | 48 | 53.7 |
| 1:30 p.m. | 59.76 g | | | 52.3 |

TABLE VI-continued

Water Release Test

| Time | Sample 2 Weight in Grams | Room Temperature (° F.) | Relative Humidity | Oven Temperature (° C.) |
| --- | --- | --- | --- | --- |
| Next Reading 5:00 a.m. | 59.76 g | | | 53.0 |

Water Vapour Transmission Rate tast

The optimum combination of durability and washability of the labels according to the invention is at least partly due to the permeability of the label for the soaking solution. A sample of the transfer layer of the same type as tested in the water uptake/release test of a thickness of 12.7 microns was tested for water vapor transmission. A 25 milliliter glass container with a 15.9 millimeter. diameter circular orifice was cleaned with acetone and filled with approximately 10 milliliters of deionized water. The orifice area of the container was heated to approximately 118° F. (47.8° C.) an a circle segment of the transfer layer was firmly applied using a small piece of silicone rubber as a pressure pad. After the container/label had cooled, the backing film was gently removed. The sample preparation was completed by adding a wax coating (0.001 g across the 1.99 cm$^2$ surface) and let air dry. A second glass container of the same dimensions as described above was cleaned thoroughly with acetone and filled with 10 milliliter of deionized water. The orifice area of the sample was heated as well. This sample was used as the control sample. The completed samples were then weighted at various intervals over a 26.6 hour time period. The water vapor transmission rate over the total time of the experiment equated to 568.75 g/m$^2$ in a 24 hour time period at 22.2° C. at 46% relative humidity. It was found that a "steady state" water vapor transmission rate was not achieved until approximately 28 minutes from time 0. When using the "steady state" data after 28 minutes from time 0, the water vapor transmission rate was found to be about 526.93 g/m$^2$ in 24 hours.

For the control sample without a label, a water vapor transmission rate over the total time of the experiment of 1085.7 g/m$^2$ in 24 hours was found. The water vapor transmission rate of the preferred label according to the present invention will lie between 50 g/m$^2$ and 750 g/m$^2$ after 24 hours (22.2° C., 44% relative humidity), preferably around 500 g/m$^2$ after 24 hours.

What is claimed is:

1. Transfer label comprising a backing layer and a transfer layer releasably attached thereto which transfer layer can be detached from the backing layer for transfer to a container, the transfer layer comprising an ink pattern, and an adhesive layer, said transfer layer being attachment to a container at least during transport and storage, wherein the transfer layer has a thickness below 30 micrometers, which transfer layer, after attachment to a container and under turbulent soaking conditions in an aqueous solution of a temperature above 20° C., and not more than 100° C., breaks up in at least 4 parts without substantially dissolving in the aqueous solution, such that said parts, after removal from a container, are separable from the solution by a mechanical separation means, each part having no dimension smaller than 5 micrometers, and being detached from the container within a soaking time of not more than 20 minutes, wherein said transfer layer, when applied to said container, has a pencil hardness of 1–7 N in a dry state thereof, and a pencil hardness of less than 0.5 N in a wetted state thereof after a soaking of 1–15 minutes in water at 20° C.

2. Transfer label according to claim 1, wherein the transfer layer is permeable for the soaking liquid.

3. Transfer label according to claim 1, wherein the transfer layer comprises a cover layer overlying the ink pattern, the cover layer forming the outwardly facing layer upon attachment of the transfer layer to a container, wherein the cover layer is permeable to the soaking liquid.

4. Transfer label according to claim 1, wherein the ink pattern is discontinuous.

5. Transfer label according to claim 4, wherein the cover layer is discontinuous and covers the discontinuous ink pattern.

6. Transfer label according to claim 4, wherein the adhesive layer is located in register with the ink pattern.

7. Transfer label according to claim 1, wherein the transfer layer comprises a layer of adhesive having tack, said tack being at least reduced by contact with the soaking liquid.

8. Transfer label according to claim 7, wherein the adhesive layer is discontinuous.

9. A transfer label according to claim 7, wherein said adhesive is dissolved in said soaking liquid.

10. Transfer label according to claim 1, wherein the aqueous liquid is an aqueous alkaline solution.

11. Transfer label according to claim 1, having a thickness below 30 micrometer.

12. A transfer label according to claim 11, wherein said thickness is between 5 and 20 micrometers.

13. Transfer label according to claim 1, comprising an adhesive layer of a weight between 1 and 10 g/m$^2$.

14. A transfer label according to claim 13, wherein said adhesive layer is of a weight between 3 and 7 g/m$^2$.

15. Transfer label according to claim 1, wherein the adhesive layer comprises at least two sublayers, the tack of the sublayer which upon attaching to a container is closest there to having a smaller tack than the layer of adhesive located further from the container.

16. A transfer label according to claim 1, wherein said aqueous liquid is of a temperature not more than 70° C., and said soaking time is not more than 10 seconds.

17. A container comprising a transfer layer which has been applied using a transfer label and a cover layer over said transfer layer, said transfer label comprising a backing layer and a transfer layer releasably attached thereto which transfer layer can be detached from the backing layer for transfer to a container, the transfer layer comprising an ink pattern and an adhesive layer, said transfer layer being attached to a container at least during transport and storage, wherein the transfer layer has a thickless below 30 micrometers, which transfer layer, after attachment to a container and under turbulent soaking conditions in an aqueous solution of temperature above 20° C. and not more than 100° C., breaks up in at least 4 parts without substantially dissolving in the aqueous solution, such that said parts, after removal from a container, are separable from the solution by a mechanical separations means, each part having no dimension smaller than 5 micrometers, and being detached from the container within a soaking time of not more than 20 minutes, wherein said transfer layer, when applied to said container, has a pencil hardness of 1–7 N in a dry state thereof, and a pencil hardness of less than 0.5 N in a wetted state thereof after a soaking time of 1–15 minutes in water at 20° C.

18. Container according to claim 17, wherein the cover layer comprises an acrylic wax.

19. Container according to claim 17, wherein the cover layer is attached upon or after attaching the transfer layer to the container.

20. Container according to claim 17, wherein the transfer layer has been heat-treated after application to the container, at a temperature between 40° C. and 100° C.

21. A container according to claim 20, wherein said temperature is between 50° C. and 90° C.

22. Container according to claim 17, comprising an application surface for the transfer layer which application surface prior to application has a surface tension of at least 60 Dyne per cm.

23. Container according to claim 17, wherein the transfer layer on the container has a water uptake value after 3 hours grater that 0 and below 100 g/m$^2$.

24. A container according to claim 23, wherein said water uptake value after 3 hours is about 5 g/m$^2$.

25. A container according to claim 17, wherein said container is a plastic crate.

26. Method of washing a container comprising a transfer layer which has been applied using a transfer label and a cover layer over said transfer layer, said transfer label comprising a backing layer and a transfer layer releasably attached thereto which transfer layer can be detached from the backing layer for transfer to a container, the transfer layer comprising an ink pattern and an adhesive layer, said transfer layer being attached to a container at least during transport and storage, wherein the transfer layer has a thickness below 30 micrometers, which transfer layer, after attachment to a container and under turbulent soaking conditions in an aqueous solution of a temperature above 20° C. and not more than 100° C., breaks up in at least 4 parts without substantially dissolving in the aqueous solution, such that said parts, after removal from a container, are separable from the solution by a mechanical separations means, each part having no dimension smaller than 5 micrometers, and being detached from the container within a soaking time of not more than 20 minutes, wherein said transfer layer, when applied to said container, has a pencil hardness of 1–7 N in a dry state thereof, and a pencil hardness of less than 0.5 N in a wetted state thereof after a soaking time of 1–15 minutes in water at 20° C., said method comprising the steps of:

a.) placing the container in an aqueous soaking solution during a soaking time no longer than 20 minutes, the temperature of the soaking solution being below 100° C., while causing turbulence in the soaking solution such that the label breaks up in at least 4 parts, each part not smaller than 5 micrometers, and is detached to the container;

b.) pumping the soaking solution through a sieve and collecting the pieces of the label on the sieve; and c.) periodically cleaning the sieve by collection and removal of the label pieces.

27. Method according to claim 26, wherein the size of the openings of the sieve is between 1 mm and 10 mm.

28. A method according to claim 27, wherein the size of the openings of said sieve are about 2 mm.

29. Method according to claim 26, comprising the step of impingement of water jets on the container before and/or after placing the container in the soaking solution.

30. Method according to claim 26, wherein the soaking solution comprises a NaOH solution comprising between 0.1 and 5% by weight.

31. A method according to claim 30, wherein said soaking solution comprises about 0.5% by weight NaOH.

32. A method according to claim 26, wherein said soaking time is not longer than 1 minute, said temperature of said soaking solution is below 70° C., and said cleaning of said sieve by collection and removal of said label pieces occurs continuously.

* * * * *

UNITED STATES PATENT AND TRADEMARK OFFICE
CERTIFICATE OF CORRECTION

PATENT NO. : 6,379,761 B1
DATED : April 30, 2002
INVENTOR(S) : Brandt et al.

It is certified that error appears in the above-identified patent and that said Letters Patent is hereby corrected as shown below:

Column 3,
Line 21, please delete "instances" and insert therefor -- instance --.

Column 8,
Line 26, after "51,51'" please insert -- has --.

Column 9,
Line 15, please delete "61" and insert therefor -- 61´ --.

Column 13,
Table IV, in the Title, please delete "(in H)" and insert therefor -- (in N) --.
Table IV, please delete the following line
 "65    2.5    1.2    0.5    0.3    0.2    0.1" and insert therefor
-- 65    5    2.5    1.2    0.5    0.3    0.2    0.1 --.

Column 14,
Line 37, please delete "(120° C.)" and insert therefor -- (121° C.) --.

Column 15,
Table V, in the Tank Water Temperature (°F.) column, please delete "71" and insert therefor -- 71 (21.7° C.) --.
Table V, in the Tank Water Temperature (°F.) column, please delete "72" and insert therefor -- 72 (22.2° C.) --.
Table V, in the Room Air Temperature (°F.) column, please delete "72.4" and insert therefor -- 72.4 (22.4° C.) --.
Table V, in the Room Air Temperature (°F.) column, please delete "72.6" and insert therefor -- 72.6 (22.6° C.) --.
Line 42, after "2" please start a new paragraph.

Column 16,
Line 48, please delete "tast" and insert therefor -- Test --.
Line 58, please delete "an" and insert therefor -- and --.

UNITED STATES PATENT AND TRADEMARK OFFICE
CERTIFICATE OF CORRECTION

PATENT NO.     : 6,379,761 B1
DATED          : April 30, 2002
INVENTOR(S)    : Brandt et al.

It is certified that error appears in the above-identified patent and that said Letters Patent is hereby corrected as shown below:

Column 17,
Line 28, please delete "C.," and insert therefor -- C. --.

Column 18,
Line 50, please delete "grater that" and insert therefor -- greater than --.

Column 19,
Line 17, please delete "to" and insert therefor -- from --.

Column 20,
Line 12, please delete "weight." and insert therefor -- weight, NaOH. --.

Signed and Sealed this

Twenty-eighth Day of January, 2003

JAMES E. ROGAN
*Director of the United States Patent and Trademark Office*